E. NETHERLAND.
EXTENSIBLE WAGON BODY.
APPLICATION FILED JUNE 19, 1915.

1,238,180.

Patented Aug. 28, 1917.

WITNESSES.
James J. Carr
P. A. Carr

Elmore Netherland. INVENTOR.

By Robert S. Carr, Attorney.

UNITED STATES PATENT OFFICE.

ELMORE NETHERLAND, OF LIBERTY, INDIANA.

EXTENSIBLE WAGON-BODY.

1,238,180.  Specification of Letters Patent.  Patented Aug. 28, 1917.

Application filed June 19, 1915. Serial No. 35,171.

*To all whom it may concern:*

Be it known that I, ELMORE NETHERLAND, a citizen of the United States, residing at Liberty, Indiana, have invented a new and useful Improvement in Extensible Wagon-Bodies, of which the following is a specification.

My invention relates to extensible wagon bodies and the objects of my improvements are to provide the body with a removable rear section for adapting it to be used as a hay rack; to provide the body and also the section with removably hinged standards for supporting auxiliary walls thereon; to provide means for maintaining said standards with the walls thereon in a predetermined outward inclination, and to provide simple and durable construction and assemblage of the various members for securing facility of operation and efficiency of action. These and other objects may be attained in the following described manner, as illustrated in the accompanying drawings in which:—

Figure 1:
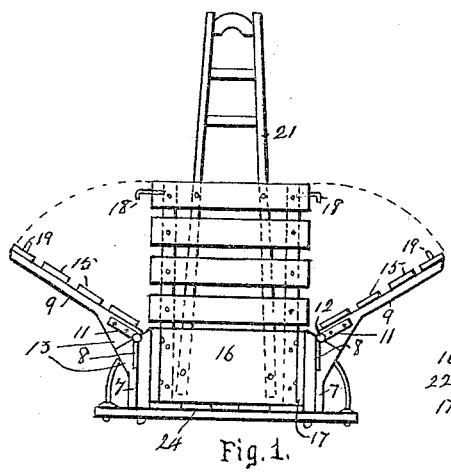
Figure 2:
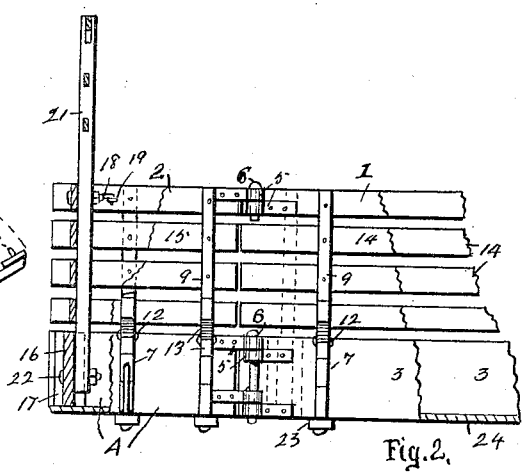
Figure 3:
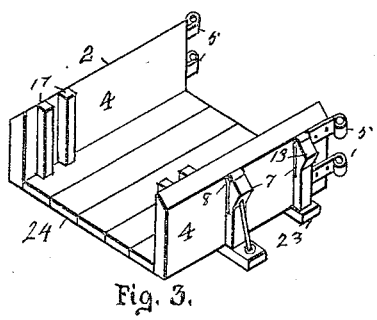

Figure 1, is a rear elevation of a wagon body embodying my improvements; Fig. 2, a side elevation with parts broken away and parts in section and Fig. 3, an isometrical view of the removable rear section.

In the drawings, 1 represents the main body portion and 2 the rear extension adapted to be removably secured thereto, 3 the fixed side walls of the body and 4 those of the said extension adapted to register therewith and each provided with suitable eye plates 5 whereby they may be removably secured together by means of the pins 6 being inserted through the eyes in said plates as shown in Fig. 2. Brackets 7 secured on the side walls of the body and also of the member 2 are each provided with a hinge member 8, and standards 9 each provided with a coacting hinge member 11 may be removably hinged thereto by means of the removable pintles 12. The brackets and standards are each formed with angular projections 13 adapted to contact for limiting the outward movement of the standards. Slats 14 are secured to the standards of the body and similar slats 15 to those of the extension for completing the hinged side walls.

The tail gate 16 may be removably supported between the cleats 17 secured on the side walls of the extension member and also in like manner on the body as shown by dotted lines in Fig. 2. Hooks 18 attached to the tail gate are adapted to engage with staples 19 secured to the side wall slats for securing said walls in the raised position as shown in Fig. 2. A ladder 21 may be removably secured to the tail gate by means of bolts 22 and a similar ladder (not shown) may be secured in like manner to the head gate of the body. Cross pieces 23 serve to support the bottom 24 in the ordinary manner.

As the wagon body is used more frequently than the hay rack it is desirable to relieve it of any superfluous weight, which may be accomplished by the removal of the rear extension member, said member being attached only when used for a hay rack to give it the additional capacity and length desired.

The extension member with its hinged walls removed may be secured to the body to be used for a scooping boot if desired.

Having fully described my improvements, what I claim as my invention and desire to secure by Letters Patent of the United States is:—

An extensible wagon body comprising a main and a rear section each provided with eye-plates on adjacent ends of their walls, pins adapted to detachably engage with the said plates for removably securing said sections together, a plurality of wall brackets on each section, corresponding standards removably hinged on the brackets and in registration therewith, said standards and brackets being formed with similar angular projections adapted to coöperate for limiting the outward movement of the standards and to maintain them in a predetermined outward inclination, top slats secured on the standards of the respective sections, eye-plates secured on the adjacent ends thereof, and pins removably inserted through said eye-plates for maintaining said slats in alinement and for assisting to support the rear section in operative position on the main section.

ELMORE NETHERLAND.

Witnesses:
L. H. STANFORD,
R. S. CARR.

Copies of this patent may be obtained for five cents each, by addressing the "Commissioner of Patents, Washington, D. C."